(12) United States Patent
Shinotsuka et al.

(10) Patent No.: US 7,767,284 B2
(45) Date of Patent: *Aug. 3, 2010

(54) OPTICAL RECORDING MEDIUM, AND, METHOD FOR MANUFACTURING THE SAME, AND METHOD AND APPARATUS FOR OPTICAL RECORDING AND REPRODUCING THEREOF

(75) Inventors: Michiaki Shinotsuka, Hiratsuka (JP); Masaru Shinkai, Yokohama (JP); Hiroyuki Iwasa, Yokohama (JP); Tatsuo Mikami, Kanagawa (JP); Yuki Nakamura, Machida (JP); Tohru Yashiro, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 1294 days.

This patent is subject to a terminal disclaimer.

(21) Appl. No.: 11/113,021

(22) Filed: Apr. 25, 2005

(65) Prior Publication Data
US 2005/0255281 A1 Nov. 17, 2005

(30) Foreign Application Priority Data
Apr. 28, 2004 (JP) ............................. 2004-133993

(51) Int. Cl.
*B32B 3/02* (2006.01)
(52) U.S. Cl. .................... 428/64.1; 428/64.4; 428/64.6; 428/65.2; 430/270.14
(58) Field of Classification Search ................ 428/64.8; 430/270.14
See application file for complete search history.

(56) References Cited

U.S. PATENT DOCUMENTS

| | | | |
|---|---|---|---|
| 4,450,553 A | 5/1984 | Holster et al. | |
| 5,169,745 A | 12/1992 | Yashiro et al. | |
| 5,202,875 A | 4/1993 | Rosen et al. | |
| 5,238,722 A | 8/1993 | Yashiro et al. | |
| 5,242,730 A | 9/1993 | Yashiro et al. | |
| 5,252,372 A | 10/1993 | Yashiro et al. | |
| 5,298,305 A | 3/1994 | Shinozuka et al. | |
| 5,316,814 A | 5/1994 | Sawada et al. | |
| 5,419,939 A * | 5/1995 | Arioka et al. | 428/823.1 |
| 5,532,033 A | 7/1996 | Yashiro | |

(Continued)

FOREIGN PATENT DOCUMENTS

JP 4-46186 2/1992

(Continued)

OTHER PUBLICATIONS

Japanese Office Action dated Mar. 31, 2009.

*Primary Examiner*—Elizabeth Mulvaney
(74) *Attorney, Agent, or Firm*—Dickstein Shapiro LLP

(57) ABSTRACT

The object of the present invention is to provide an optical recording medium which comprises a substrate, and a first information layer and a second information layer disposed on the substrate, and an intermediate layer disposed between the first information layer and the second information layer, wherein any one of recording and reproducing is performed in the first information layer and the second information layer by irradiating a laser beam from the first information layer side, the second information layer comprises a protective layer, a second dye layer which comprises an organic dye, an oxidized layer, and a reflective layer in this order from the laser beam irradiation side, and the oxidized layer comprises an oxide which is a material constituting the reflective layer.

2 Claims, 3 Drawing Sheets

U.S. PATENT DOCUMENTS

| | | | |
|---|---|---|---|
| 5,580,696 A | 12/1996 | Yashiro | |
| 5,789,138 A | 8/1998 | Yashiro | |
| 5,882,757 A | 3/1999 | Yashiro | |
| 5,968,708 A | 10/1999 | Yashiro et al. | |
| 5,974,025 A | 10/1999 | Yamada et al. | |
| 6,018,510 A | 1/2000 | Abe et al. | |
| 6,045,971 A | 4/2000 | Yashiro | |
| 6,063,468 A * | 5/2000 | Aratani et al. | 428/64.1 |
| 6,096,398 A | 8/2000 | Yuzurihara et al. | |
| 6,128,274 A | 10/2000 | Mori et al. | |
| 6,137,769 A | 10/2000 | Sawada et al. | |
| 6,221,557 B1 | 4/2001 | Harigaya et al. | |
| 6,280,810 B1 | 8/2001 | Nakamura et al. | |
| 6,287,660 B1 * | 9/2001 | Hosaka et al. | 428/64.1 |
| 6,469,963 B1 | 10/2002 | Sawada et al. | |
| 6,562,432 B2 | 5/2003 | Ogawa et al. | |
| 6,592,958 B2 | 7/2003 | Nakamura et al. | |
| 6,652,948 B2 | 11/2003 | Shinotsuka | |
| 6,680,899 B2 * | 1/2004 | Komaki et al. | 369/283 |
| 6,790,504 B2 | 9/2004 | Shinotsuka | |
| 6,794,005 B2 | 9/2004 | Noguchi et al. | |
| 6,846,611 B2 | 1/2005 | Yuzurihara et al. | |
| 6,875,489 B2 * | 4/2005 | Koya et al. | 428/64.1 |
| 6,886,177 B2 | 4/2005 | Katoh et al. | |
| 6,905,749 B2 * | 6/2005 | Fukuzawa | 428/64.1 |
| 7,163,730 B2 * | 1/2007 | Hsiao | 428/64.4 |
| 7,336,596 B2 * | 2/2008 | Matsumoto et al. | 369/283 |
| 2001/0021154 A1 | 9/2001 | Katoh et al. | |
| 2002/0110063 A1 | 8/2002 | Yamada et al. | |
| 2002/0160306 A1 | 10/2002 | Hanaoka et al. | |
| 2003/0035360 A1 | 2/2003 | Shinotsuka et al. | |
| 2003/0043712 A1 | 3/2003 | Nakamura et al. | |
| 2003/0044719 A1 | 3/2003 | Katoh et al. | |
| 2003/0059712 A1 | 3/2003 | Yashiro | |
| 2003/0063539 A1 | 4/2003 | Yashiro | |
| 2003/0081537 A1 | 5/2003 | Shinotsuka | |
| 2003/0124459 A1 | 7/2003 | Yashiro et al. | |
| 2003/0214902 A1 | 11/2003 | Yamada et al. | |
| 2003/0215673 A1 | 11/2003 | Mikami et al. | |
| 2004/0001418 A1 | 1/2004 | Shinotsuka et al. | |
| 2004/0037203 A1 | 2/2004 | Harigaya et al. | |
| 2004/0085879 A1 | 5/2004 | Katoh et al. | |
| 2004/0085880 A1 | 5/2004 | Katoh et al. | |
| 2004/0115386 A1 | 6/2004 | Shinkai et al. | |
| 2005/0013235 A1 | 1/2005 | Yashiro et al. | |
| 2007/0283377 A1 * | 12/2007 | Nakamura et al. | 720/718 |

FOREIGN PATENT DOCUMENTS

| | | |
|---|---|---|
| JP | 4-226390 | 8/1992 |
| JP | 05/298752 | 11/1993 |
| JP | 6195746 | 7/1994 |
| JP | 11-149664 | 6/1999 |
| JP | 2000-311384 | 11/2000 |
| JP | 2001-10709 | 1/2001 |
| JP | 2001-84643 | 3/2001 |
| JP | 2001-291278 | 10/2001 |
| JP | 2002-249633 | 9/2002 |
| JP | 2002-542563 | 12/2002 |
| JP | 2003-303447 | 10/2003 |
| JP | 2003-331473 | 11/2003 |
| WO | WO 00/16320 | 3/2000 |
| WO | WO 00/23990 | 4/2000 |
| WO | WO 00/63899 | 10/2000 |

* cited by examiner

OPTICAL RECORDING MEDIUM, AND, METHOD FOR MANUFACTURING THE SAME, AND METHOD AND APPARATUS FOR OPTICAL RECORDING AND REPRODUCING THEREOF

BACKGROUND OF THE INVENTION

1. Field of the Invention

The present invention relates to an optical recording medium in which recording and reproducing of information is performed, and write-once read many is possible by irradiating a laser beam to the optical recording medium to induce optical changes, such as, a light transmittance and a reflectance, to a dye layer and also relates to a method for manufacturing the optical recording medium. The present invention further relates to a method and an apparatus for the recording and reproducing.

2. Description of the Related Art

In recording of information in which reflectance changes associated with a deformation of a dye layer or the like by means of laser beam irradiation is utilized, optical hole burning phenomena induced by optical absorption of a dye layer is used. Write once read many optical recording media that are put into practical use generally recognize a not-recorded portion as in a low-reflectance state and recognize a portion having an optical hole as a record mark in a high-reflectance state. Such a portion having an optical hole comes into a high-reflectance because a metal reflective layer adjacent to the optical hole has a high reflectance.

As an optical recording medium having an organic dye layer as a recording layer, there are many optical recording media known in which a phthalocyanine dye, a cyanine dye, a phenanthrene dye, a naphthoquinone dye, and the like are used.

A read only compact disc recording medium (CD-R) in which an organic dye layer, a metal reflective layer, and a UV curable resin protective layer are sequentially disposed on a substrate requires a high reflectance to meet its CD standards. Therefore, it is needed to develop an organic dye which has a high refraction index at a wavelength of a laser beam for recording and reproducing of information (770 nm to 830 nm) and high performance stability in the recording and reproducing (a wavelength for recording and reproducing of a DVD±R (Digital Versatile Disc±Recordable) is 630 nm to 680 nm).

With respect to CD-R, and DVD±R, there are a number of optical recording media have been proposed in which a cyanine dye and a metal reflective layer, a phthalocyanine dye and a metal reflective layer, or an azo metal-chelate dye and a metal reflective layer or the like are used as recording materials. Examples of the optical recording media include the one that uses a phthalocyanine dye as a recording material (see Japanese Patent Application Laid-Open (JP-A) No. 04-226390), the one that uses an azo metal-chelate dye as a recording material (see JP-A Nos. 04-226390 and 04-46186). However, all of them have only one dye layer and have just a storage capacity of one layer.

Further, to increase a storage capacity of an optical disc, a system having a plurality of data layers has been proposed. An optical disc having tow or more data layers is accessible to various layers by changing its lens focal point.

For example, U.S. Pat. No. 5,202,875 describes an optical disc drive system having a plurality of data layers. The optical disc drive system comprises any one of a plurality of substrates each of which has data layers with an air-gap spacing provided therebetween, or a plurality of data layers configured to have a solid structure. The optical disc disclosed in U.S. Pat. No. 4,450,553 uses a solid structure in which a plurality of data layers are disposed, and the data layers are respectively a data layer for compact disc (CD).

In addition, optical recording media disclosed in International Publication Nos. W00/016320 and WO00/023990 respectively have a recording layer which comprises only a dye layer or a phase-change layer and do not employ a structure of layers in consideration of its reflectance and compatibility with DVD or the like. For these optical recording media, it is described in their aspects that an information layer comprises two or more layers, but the disclosures do not exactly allow for an optical recording medium having two recording dye layers.

In addition, Japanese Patent Application Laid-Open (JP-A) Nos. 2001-084643 and 2001-10709 disclose an optical recording medium having two inorganic recording layers.

As mentioned above, there are a variety of applications proposed for a multi-layered-structured optical recording medium, but almost all of them were not put into practical use and/or do not allow for its reflectance and compatibility with DVD or the like.

Dye materials have been used since the CD generation, and it is designed to absorb a laser beam at the wavelength to be used. To make an optical recording medium have a multi-layered structure with a dye material, it is required to achieve a balance between a light transmission and a light absorption, but it is technically difficult to do so, and therefore, the development of a technique for making an optical recording medium have a multi-layered structure using a dye material has not yet been completed so far.

In other words, with a conventional structure of an optical recording medium in which a dye layer, a reflective layer, a UV curable resin protective layer are sequentially disposed, it is impossible to give two dye layers to an optical recording medium, because Ag to be used for a reflective layer has a thickness close to 100 nm, and a laser beam hardly transmits to a wavelength of a red laser diode (630 nm to 800 nm) and to a wavelength of a blue laser diode (360 nm to 430 nm).

In Japanese Patent Application Laid-Open (JP-A) No. 2003-331473, a multi-layered optical information recoding medium is proposed, which comprises two or more optical sensory recording layers enabling optically recording and reproducing of information on the substrate and has at least an intermediate layer having a thickness of 0.05 μm to 0.2 μm between the two or more optical sensory recording layers. However, in the proposal a dye layer disposed at the innermost side viewed from the laser beam irradiation side is directly coated on an Ag layer and an Ag alloy layer. Therefore, it still has problems with nonuniformity of dye-coating and portions with short of dye-coating; degradation of jitter properties, which are recording and reproducing properties; and the inclination that an error is liable to occur. Besides, there are still more problems that a reflective layer located at the innermost side from a laser beam irradiation side is subjected to a heavy damage due to its poor heat radiation properties at the innermost layer; deformations of the reflective layer may cause substantial deterioration of groove signals; and tracking of a record mark may be derailed on the side to which a high-recording power is given.

Besides, in Japanese Patent Application Laid-Open (JP-A) No. 2000-311384, an optical recording medium which comprises two layers of light absorptive layer (dye layers) as shown in FIG. 1, is proposed. The proposal is characterized in that two layers of a first light absorptive layer 12 and a second light absorptive layer 16 are disposed therein, and a first barrier layer 13 and a second barrier layer 15 are disposed between the light absorptive layers and an intermediate layer 14. With the structure of layers according to the proposal, however, it has disadvantages that excellent recording and reproducing properties cannot be obtained due to its poor wet properties of dye coating; the reflective layer may be deformed because of its not excellent heat radiation properties brought about by only a reflective layer, which may result in a problem that a tracking trouble or the like may occur.

SUMMARY OF THE INVENTION

It is, therefore, an object of the present invention to provide an optical recording medium which comprises two information layers made from dye materials, which allows improving wet properties of dye coating to materials for a reflective layer when a second dye layer disposed at the innermost side viewed from the laser beam irradiation side is formed on the reflective layer and has excellent jitter properties for recording and reproducing and fewer errors and enables high-density recording, and also provide a method for manufacturing the optical recording medium, and a method and an apparatus for the recording and reproducing.

An optical recording medium according to the present invention comprises a substrate, and a first information layer and a second information layer disposed on the substrate, and an intermediate layer disposed between the first information layer and the second information layer, wherein recording and reproducing of information is performed respectively in the first information layer and the second information layer by irradiating a laser beam from the first information layer side.

The second information layer comprises a protective layer, a second dye layer which comprises an organic dye, an oxidized layer, and a reflective layer in this order from the laser beam irradiation side, and the oxidized layer comprises an oxide which is a material constituting the reflective layer. In the optical recording medium according to the present invention, wet properties of dye coating becomes excellent when coating the second dye layer in the second information layer by disposing an oxidized layer on a reflective layer, the jitter properties for recording and reproducing becomes excellent, frequency of trouble occurrences is reduced, and high-density recording is possible.

The method for manufacturing an optical recording medium according to the present invention is a method for manufacturing the optical recording medium of the present invention, which comprises forming a first reflective layer and a second reflective layer on the substrate in this order and then forming an oxidized layer by oxidizing the second reflective layer. In the method for manufacturing the optical recording medium according to the present invention, at first a reflective layer is formed, then the reflective layer is left in an environment full of oxygen (in the presence of oxygen or in the air), and by oxidizing the surface of the reflective layer, wet properties of coating are improved to allow effective forming of a dye layer with no occurrence of nonuniformity of coating.

In the method for optical recording and reproducing of an optical recording medium according to the present invention, any one of recording and reproducing of signal information in the first dye layer and the second dye layer are performed by irradiating a laser beam to the optical recording medium of the present invention from the first information layer side. In the method for the optical recording and reproducing of the optical recording medium, any one of recording and reproducing of information can be effectively performed in a stable and assured manner.

In the apparatus for optical recording and reproducing according to the present invention, information is recorded in an optical recording medium by irradiating a laser beam to the optical recording medium from a laser beam source, and the recording medium is the optical recording medium according to the present invention. In the apparatus for optical recording and reproducing according to the present invention, any one of recording and reproducing of information can be performed in a stable and assured manner.

DESCRIPTION OF THE PREFERRED EMBODIMENTS

Optical Recording Medium

Figure 1:
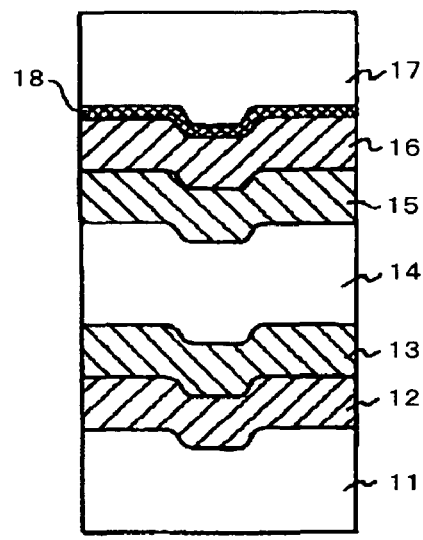
FIG. 1 is a sectional view showing an example of a multi-layered structure of a conventional optical recording medium.

The optical recording medium according to the present invention comprises a substrate, and a first information layer and a second information layer disposed on the substrate, and an intermediate layer disposed between the first information layer and the second information layer, and may comprise other layers as required.

In the optical recording medium, any one of recording and reproducing are performed respectively in the first information layer and the second information layer by irradiating a laser beam from the first information layer side.

The second information layer comprises a protective layer, a second dye layer, an oxidized layer, and a reflective layer in this order from the laser beam irradiation side and may comprise other layers as required.

The first information layer comprises a first dye layer which comprises an organic dye and a semi-translucent layer in this order from the laser beam irradiation side and may comprise other layers as required.

Here, the present invention is characterized in that in the optical recording medium which comprises two information layers of the first and the second information layers, an oxidized layer is formed between the reflective layer disposed at the innermost side of the second information layer viewed from the laser beam irradiation side and the second dye layer for enhancing wet properties in coating a dye on the reflective layer to improve the coated state of the second dye layer.

The oxidized layer comprises an oxide which is a material constituting the reflective layer. Specifically, the oxidized layer comprises one element selected from an Ag oxide, an Al oxide, a Cu oxide, an Ag alloy oxide, an Al alloy oxide, and a Cu alloy oxide. The oxidized layer preferably comprises the above-noted oxide at least on the surface thereof.

The method of forming the oxidized layer is not particularly limited and may be selected in accordance with the intended use. As mentioned below, the oxidized layer can be easily formed by forming a reflective layer, then leaving the reflective layer in an environment full of oxygen (in the presence of oxygen or in the air), and oxidizing the surface of the reflective layer.

If the second dye layer is formed immediately after forming the reflective layer, wet properties of a dye shows poor performance and nonuniformity of coating may occur, and if a dye is coated before heat in the reflective layer becomes stable, there may be cases where not only machine properties but also recording and reproducing properties become degraded.

In fact, comparing the case where a second dye layer is formed immediately after forming a reflective layer on a substrate to the case where a reflective layer is formed and then the reflective layer is left in the presence of oxygen for one hour to form an oxidized layer, followed by formation of a second dye layer on the oxidized layer (this applies to Example 1, described hereafter), in the case of forming a second dye layer immediately after forming a reflective layer, it was impossible to coat a dye uniformly and completely on the reflective layer, and it was impossible to measure the recording and reproducing properties, because tracking itself was impossible.

The oxidized layer preferably has a thickness of 0.5 nm to 20 nm, more preferably has a thickness of 1 nm to 10 nm. If the thickness is less than 0.5 nm, only a little effect of improvement in wet properties is obtained and the jitter properties of recording and reproducing properties may not be improved. If more than 20 nm, it becomes difficult to control a reflectance of the second information layer located on the innermost side to be kept up to 15% or more, and there may be cases where it becomes difficult to start a DVD playback.

The optical recording medium of the present invention in which layers made from a dye material are included, information is recorded by inducing optical hole burning and deformations in the dye layers by means of irradiation of a laser beam, and reproduction of information is performed by means of changes in reflectance associated with the optical hole burning and the deformations.

By making the reflective layer in the first information layer which is located on the laser beam irradiation side semi-translucent, the reflectance and the light transmittance can be controlled. When recording information at a wavelength of a red laser diode, it is necessary to give a reflectance (15% to 30%) equivalent to that of a two-layered ROM (Read Only Memory), such as, DVD, to the first information layer to maintain its compatibility with it and to set the light transmittance at around 50% to make a laser beam transmitted to the second information layer located at the innermost side from the laser beam irradiation side so that recording of information can be performed in both of the two information layers. To ensure the compatibility, it is preferable that the second information layer also has a reflectance of 15% to 30%.

These two information layers may be formed through an intermediate layer with guide grooves formed thereon. Materials of the intermediate layer is not particularly limited, provided that it has a light transmittance of 80% or more at a laser wavelength ranging from 400 nm to 790 nm and it is thermally stable. Typically, the intermediate layer is formed using a UV curable resin and an acrylate resin which are excellent in terms of cost. A pressure-sensitive adhesive sheet made from an acrylate resin or the like may be used for the intermediate layer.

Hereafter, an aspect of the optical recording medium of the present invention will be illustrated referring to the accompanying drawings.

Figure 2:
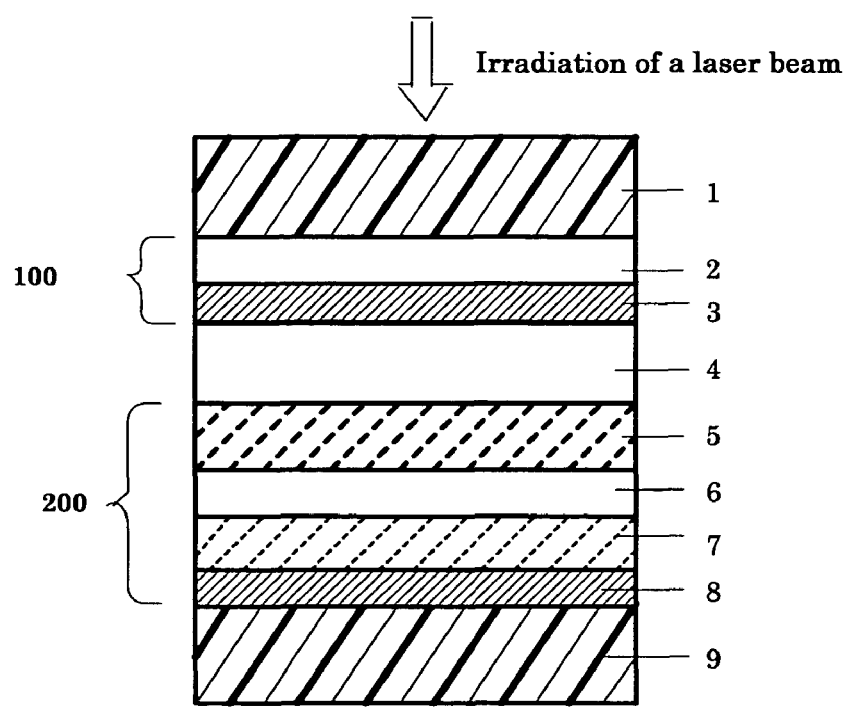
FIG. 2 is a sectional view schematically showing an example of a multi-layered structure of the optical recording medium according to the present invention.

FIG. 2 is a sectional view schematically showing an example of a structure of layers of the optical recording medium according to the present invention. The optical recording medium includes a substrate 1/a first dye layer 2/a semi-translucent reflective layer 3/an intermediate layer 4/a protective layer 5/a second dye layer 6/an oxidized layer 7/a reflective layer 8, and a cover substrate 9. A first information layer 100 includes the first dye layer 2 and the semi-translucent reflective layer 3. A second information layer 200 includes the protective layer 5, the second dye layer 6, the oxidized layer 7, and the reflective layer 8.

Figure 3:
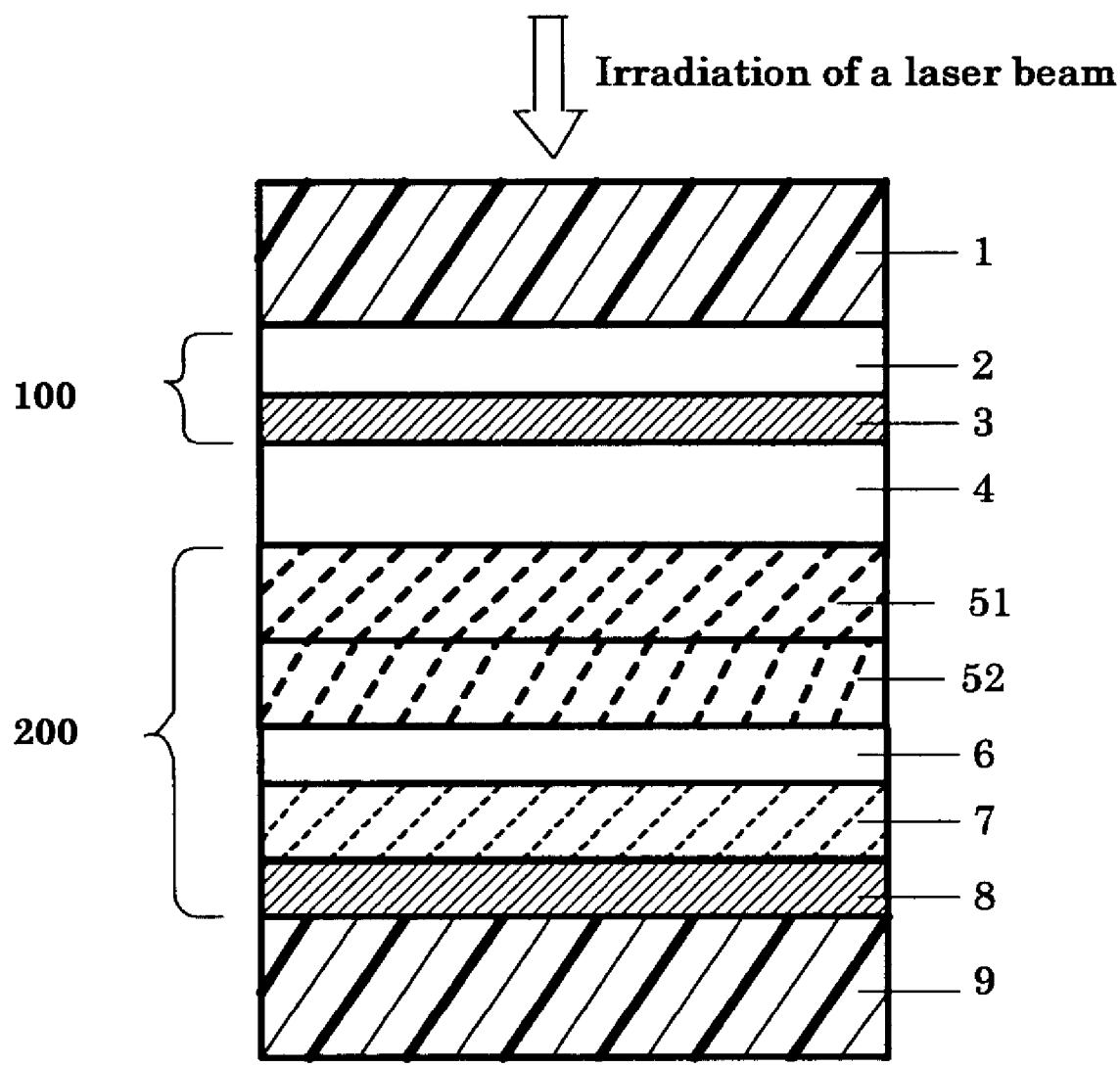
FIG. 3 is a sectional view schematically showing another example of a multi-layered structure of the optical recording medium according to the present invention.

FIG. 3 is another example of a structure of layers, in which the protective layer 5 in FIG. 2 is replaced by two layers of a first protective layer 51 and a second protective layer 52.

Figure 4:
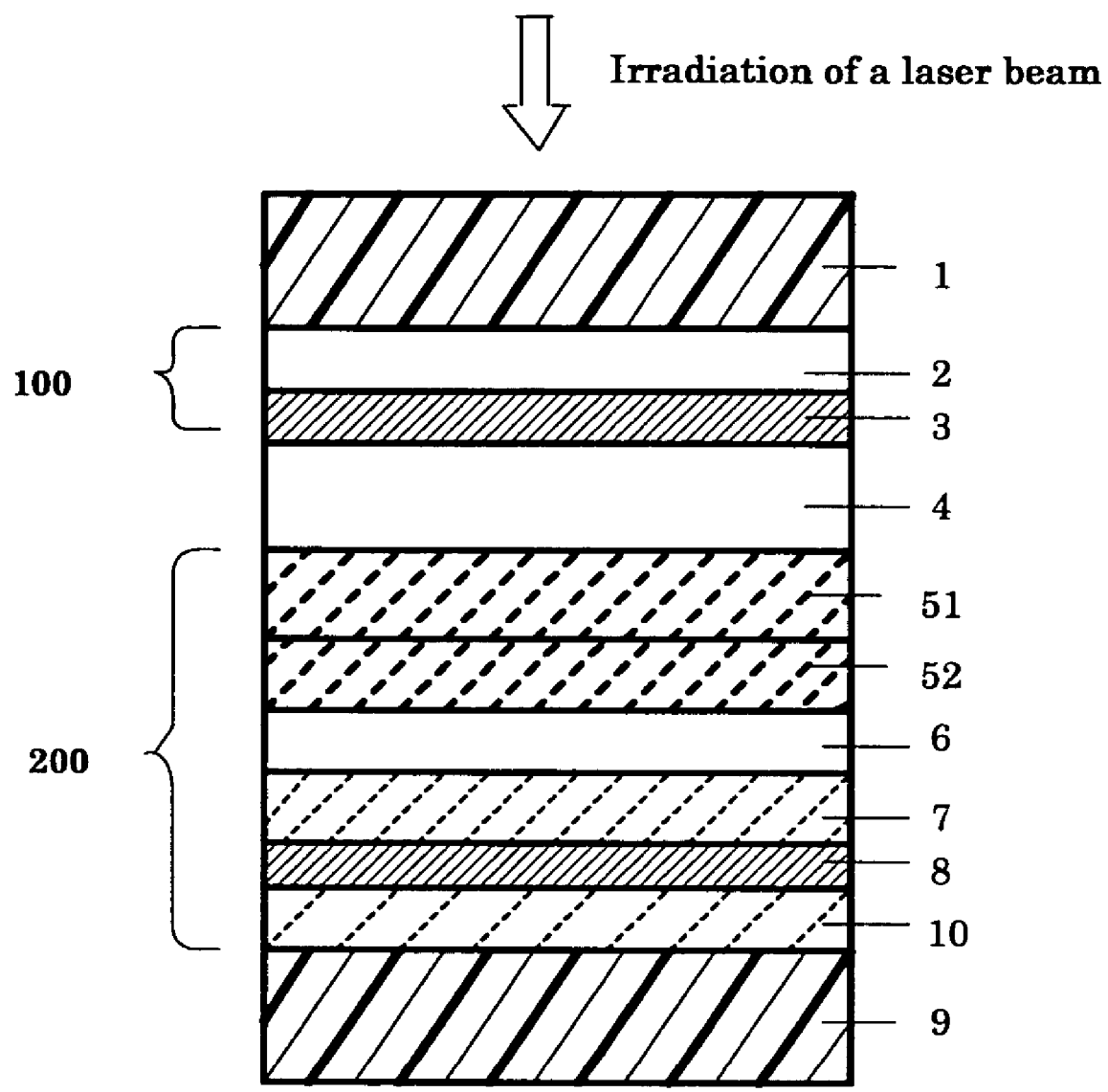
FIG. 4 is a sectional view schematically showing still another example of a multi-layered structure of the optical recording medium according to the present invention.

FIG. 4 is still another example of a structure of layers, and in the structure, a heat-resistant layer 10 is formed in addition to the structure of layers in FIG. 3.

Materials of the substrate and the cover substrate are not particularly limited and may be selected in accordance with the intended use. Examples of the materials of the substrate and the cover substrate include a polycarbonate resin, an acrylate resin, an epoxy resin, a polystyrene resin, an acrylonitrile-styrene copolymer, a polyethylene resin, a polypropylene resin, a silicone resin, a fluorocarbon resin, an ABS resin, an urethane resin, and a clear glass. Among these materials, a polycarbonate resin and an acrylate resin are particularly preferable because of their excellence in terms of cost.

Typically, it is preferable that grooves are formed on the substrate and the cover substrate for guiding a laser beam of recording and reproducing of information, and each of the guide grooves has a pitch of 0.8 μm or less. These guide grooves are not necessarily formed in rectangular or trapezoidal grooves. For example, the grooves may be optically formed by means of an ion-implantation process to form waveguides each of which has a different refraction index.

The thickness of the substrate and the cover substrate may be changed to remove chromatic aberrations depending on the lens numerical aperture (NA) of an evaluation system's pickup. Typically, when the pickup has a lens numerical aperture (NA) of 0.6 to 0.65, the substrate and the cover substrate are required to have a thickness of 0.6 mm, and when the lens numerical aperture (NA) is 0.85 or so, these substrate are required to have a thickness of 0.1 mm. Therefore, it is preferable that the substrate and the cover substrate are respectively formed in a sheet.

As a method for forming a thin substrate using a transparent film sheet, for example, it may be formed by laminating transparent film sheets through a ultraviolet curable resin or a transparent pressure-sensitive adhesive sheet, and a thin substrate may be formed by coating a ultraviolet curable resin on the protective layer and curing the surface of the ultraviolet curable resin.

Dye materials used for the first and second dye layers are not particularly limited and may be selected in accordance with the intended use. Examples of the dye materials include a cyanine dye, a phthalocyanine dye, an azo metal chelate dye, and a squarylium. By including these dyes into the first and second dye layers, it becomes possible to easily form a small mark to respond to high-density recoding.

It is preferable that the first and the second dye layers respectively have a thickness of 30 nm to 150 nm. When the thickness is less than 30 nm, it tends to be hard to obtain a sufficient contrast, and the modulation tends to be reduced. On the other hand, when more than 150 nm, it may become hard to write a small mark.

In high-density recording where the length of the shortest record mark is 0.5 μm or less, it is preferable that the first and the second dye layers respectively have a thickness of 50 nm to 100 nm. If less than 50 nm, it is not preferable, as the reflectance may exceedingly become lower, and the thickness thereof is liable to be uneven. If thicker than 100 nm, the thermal capacity tends to become greater to worsen the recording sensitivity, and an edge of record mark tends to be distorted due to nonuniformity of thermal conductivity to lead to a higher jitter value.

Typically, the first and the second dye layers are preferably formed by spin-coating. A spin-coated dye layer is nearly even, but recording induces deformations, optical hole burning in the dye layer, and deformations in the substrate, and a record mark can be judged from a change in reflectance of such a portion. Typically, the difference in reflectance between before recording and after recording is greater than 5%.

Coating of a dye layer in a case of one dye layer seen in a conventional optical recording medium was in a proper coating condition, since a dye layer was coated on a substrate made from a polycarbonate resin. However, in a case of two dye layers, like the present invention, the second dye layer located at the innermost from the laser beam irradiation side will be coated on a reflective layer made from a metal. When directly coating a dye on a metal in this way, nonuniformity of coating is liable to occur.

Then, if an oxidized layer made from the same metal oxide as the metal oxide constituting the reflective layer is formed on the reflective layer and then a dye layer is formed on the oxidized layer, the dye layer will be in a proper coating condition, and the jitter value will show a favorable value.

The protective layer has functions for preventing reactions from the second dye layer and the intermediate layer and for controlling a reflectance of the second information layer located at the innermost side from the laser beam irradiation side. It is also effective to prevent deformations of the surface of the intermediate layer due to elevated temperature at the time of recording.

Materials of the protective layer (in a case of structure based on two protective layers, materials of the second protective layer) are determined in consideration of its refraction index, thermal conductivity, chemical stability, mechanical strength, and adhesion properties. With respect to physical properties of the materials of the protective layer, it is preferable to have a low thermal conductivity of $1 \times 10^{-3}$ pJ/($\mu$m·N·nsec) as a guide. It is difficult to directly measure the thermal conductivity of a thin layer made from a low thermal conductive material, and as an alternative to direct measuring, a guide of the thermal conductivity of the protective layer may be obtained from thermal simulations and actual measuring results of recording sensitivity.

As for the low-thermal conductive materials, for instance, it is preferably composite dielectrics which include 50 mole % to 90 mole % of at least one element selected from ZnS, ZnO, $TaS_2$, a rare-earth sulfide, and include a heat-resistant compound which has a high transparency and has a melting point or a decomposition point of 1000° C. or more. Particularly, composite dielectrics which include 70 mole % to 90 mole % of ZnS and ZnO or composite dielectrics which include 60 mole % to 90 mole % of a rare-earth sulfide, such as, La, Ce, Nd, and Y, are preferable.

Examples of the heat-resistant compound which has a high transparency and has a melting point or a decomposition point of 1000° C. or more include an oxide, a nitride, and a carbide, such as, Mg, Ca, Sr, Y, La, Ce, Ho, Er, Yb, Ti, Zr, Hf, V, Nb, Ta, Zn, Al, Si, Ge, and Pb; and a fluoride, such as, Ca, Mg, and Li. These oxides, sulfides, nitrides, carbides, and fluorides do not necessarily take a stoichiometric composition. A composition of these materials may be controlled and mixed for use for controlling a reflectance or the like.

In the light of the conformity between the above-noted points and materials constituting the first and the second dye layers, a mixed composition of ZnS and $SiO_2$ is particularly preferable for materials of the protective layer.

With respect to the thickness of the protective layer, when recording is performed at a wavelength of laser beam of 600 nm to 700 nm and a refraction index of the protective layer is ranging from 1.9 to 2.4, the protective layer preferably has a thickness of 40 nm to 160 nm, more preferably has a thickness of 100 nm to 140 nm. When recording is performed at a wavelength of 350 nm to 600 nm and a refraction index of the protective layer is ranging from 1.9 to 2.4, the protective layer preferably has a thickness of 30 nm to 100 nm, more preferably has a thickness of 40 nm to 80 nm.

The same applies to the case of a layer-structure having two protective layers, which will be explained hereafter. If it has a same refraction index as stated above, it is suitable that the total thickness of the two protective layers is also within the range stated above.

Basically, the product of a refraction index (n) and a thickness (d) may be a similar value. In other words, if the refraction index is reduced, the thickness of the protective layer should be set thicker than that used with the initial reflection index. This is required because it is necessary to keep a similar value and an optical path difference ($2*n*d$) is a phase difference, and therefore, with a too thick protective layer, it becomes hard to control the phase difference, namely, the modulation.

According to the present invention, a low jitter value can be achieved in high-density recording with a shortest record mark length of 0.3 $\mu$m or less, but when a much shorter wavelength of a laser diode (for example, 410 nm or less) is used in order for realization of much higher-density recording, it is needed to give special consideration to its quenching mechanism.

For instance, by giving a protective layer a two-layered structure and using a material which has high thermal conductivity for the first protective layer which is adjacent to an intermediate layer, it becomes possible to make the heat radiation properties and the jitter value of the second information layer much enhanced and it is also possible to reduce deformations of the reflective layer, because heat generated on the second dye layer at the time of recording diffuses into the reflective layer side and also into the first protective layer in proportion to the thermal conductivity and the thickness of the first protective layer.

Examples of a material for the first protective layer include $In_2O_3$, ZnO, ZrO, $Ti_2O_3$, SnO, $Al_2O_3$, and $SiO_2$.

If the first protective layer and the second protective layer are formed using the same material, it is advantageous from the viewpoint of manufacturing cost reduction.

Next, a semi-translucent reflective layer and a reflective layer which assume the roles of laser beam reflection and heat radiation will be explained.

Metals are used for materials of the semi-translucent reflective layer and the reflective layer. Among metals, Ag, Al, Cu, or an alloy thereof are preferable. A reflective layer made from Ag or an Ag alloy, which have high thermal conductivity, is particularly preferable in order to realize a quenching mechanism and to enable high-density recording.

As to the semi-translucent reflective layer, it is required to make it thin for transmitting a laser beam to the layer. It is also required to delay the deposition rate at the time of forming the layer to get rid of unevenness of its thickness. The semi-translucent reflective layer preferably has a thickness of 5 nm to 20 nm. If the thickness is less than 5 nm, the layer becomes uneven, even with a delayed deposition rate. When Ag or an Ag alloy is used for the semi-translucent reflective layer with its thickness defined as 10 nm or so, the light transmittance will be 50% or more at both red wavelength and blue-violet wavelength of a laser beam for the recording and reproduction of information.

The reflective layer preferably has a thickness of 100 nm to 300 nm, and more preferably has a thickness of 130 nm to 300 nm. To enhance heat radiation properties of the second information layer located at the innermost side from the laser beam irradiation side, it is preferable that the reflective layer is made thicker, but if more than 300 nm, it is not preferable in terms of manufacturing cost, as it takes long time to form a reflective layer, and it costs much in its material. In addition, the microscopic flatness of the layer surface may also become impaired.

With respect to the Ag alloy, examples of components to be added to Ag include 0.2 atomic % to 5 atomic % of at lease one element selected from Cu, Ti, V, Ta, Nb, W, Co, Cr, Si, Ge, Sn, Sc, Hf, Pd, Rh, Pt, Mg, Zr, Mo, and Mn. If greater importance is placed on temporal stability, Ti and Mg is preferred as a component to be added to Ag.

An Ag alloy will increase its volume resistivity in proportion to the concentration of the element to be added. On the other hand, it is generally believed that addition of impurities makes crystal particle diameters smaller to increase electron scattering in grain boundary and then to reduce thermal conductivity. Thus, to increase crystal particle diameters to obtain high thermal conductivity intrinsic to the material, it is preferable that the amount of impurities to be added to Ag is controlled.

Typically, a layer made from Ag or an Ag alloy is formed by sputtering or a vacuum evaporation method. It is required that the total amount of impurities including the amount of water and oxygen get mixed at the time of forming the layer as well as the amount of impurities of its target and evaporation materials themselves be 2 atomic % or less. Therefore, it is preferable that the base vacuum process chamber pressure is set at $1 \times 10^{-3}$ Pa or less. When forming the layer with a base vacuum process chamber pressure lower than $1 \times 10^{-4}$ Pa, the deposition rate is preferably set at 1 nm/sec. or more and more preferably set at 10 nm/sec. or more to prevent impurities from being introduced. Further, when more than 1 atomic % of an intended element is added to Ag, it is preferable that the deposition rate is set at 10 nm/sec. or more to prevent impurities from being introduced as much as possible.

To define an Ag layer or an Ag alloy layer which has a high thermal conductivity showing suitable properties in the present invention, it may be directly measure the thermal conductivity, but it is possible to estimate the level of thermal conduction by utilizing the electrical resistance. This is because in a material in which electrons principally control its thermal conduction or electrical conduction, like a metal layer, a favorable proportional relationship resides between thermal conductivity and electrical conductivity. Electrical resistance of a layer is expressed with a value of resistance standardized with its thickness and the dimension of area to be measured. Volume resistivity and sheet resistivity can be generally measured by the 4-probe method, and they are standardized by JIS N 7194. The regulation makes it possible to obtain data which has excellent repeatability more easily than in actual measurements of thermal conductivity of a layer.

The layer made form Ag or an Ag alloy preferably has a volume resistivity ranging from 20 n$\Omega$·m to 10 n$\Omega$·m and more preferably of 20 n$\Omega$·m to 100 n$\Omega$·m. It is virtually hard to obtain a layer having a volume resistivity of 20 n$\Omega$·m or less. Even with a layer with a volume resistivity of 150 n$\Omega$·m or more, for example, when the layer has a thickness of 300 nm or more, the sheet resistivity can be reduced; however, according to the studies sought by the inventor of the present invention, however, it was impossible to obtain sufficient heat radiation effect if only sheet resistivity is reduced in a material having such a high volume resistivity. It is considered that this is because in a thick layer, the thermal capacity per unit area becomes increased.

Thus, it is preferable to use a material having a low volume resistivity which enables obtaining a sheet resistivity of 0.2 $\Omega$/square to 0.9 $\Omega$/square with a thickness of layer of 300 nm or less, and it is much preferable to use a material which enables obtaining a sheet resistivity of 0.5 $\Omega$/square or so.

The above-noted reflective layer may be made into two or more layers. Making a reflective layer have a structure of two or more layers is effective when obtaining a reflective layer with a desired thickness and a desired sheet resistivity in combination with a material having high volume resistivity and a material having low volume resistivity. Controlling of volume resistivity by means of alloying becomes a factor which increases manufacturing costs of a sputtering target and raw material costs of a medium, although sputtering processes may be simplified since an alloy target is used in the process. Therefore, using a layer made from pure Al and pure Ag and a thin layer itself which is consisted of the above noted elements to be added to make a reflective layer have a structure of two or more layers to obtain a desired volume resistivity also brings about advantages. If the number of reflective layers is defined up to three layers, individual costs of media may be restrained after all, although the initial cost for a sputtering apparatus is increased. It is preferable to make a reflective layer have a structure of tow or more layers which are made from a plurality of metal layers, the total of the thickness is 100 nm to 300 nm, and 50% or more of the thickness of the reflective layer is from a metal layer (or metal layers) having a volume resistivity of 20 n$\Omega$·m to 150 n$\Omega$·m.

Besides, an oxidized layer may be formed for the purpose of improving adhesiveness between the intermediate layer and the semi-translucent reflective layer, which is not shown in the accompanying drawings. For example, when a semi-translucent reflective layer was formed using $Ag_{97}In_3$, then the layer was left in the presence of oxygen for one hour to form a $Ag_{97}In_3O_1$ layer having a thickness of 1 nm with the same conditions of other layers' structure and thickness as Example 1, which will be explained below, it showed the recording and reproducing properties equivalent to those of Example 1.

(Method for Manufacturing Optical Recording Medium)

The method for manufacturing for the optical recording medium according to the present invention comprises forming an oxidized layer and other steps as required.

In the step for forming an oxidized layer, a first reflective layer and a second reflective layer are formed on a substrate in this order, and then the second reflective layer is oxidized to form an oxidized layer.

Here, it is preferable that the substrate with the first reflective layer and the second reflective layer formed in this order thereon is left in an oxygen atmosphere to oxidize at least the surface of the second reflective layer.

For the oxygen atmosphere, an atmosphere which includes 20% or more oxygen, such as, air, oxygenated air and the like is used. The substrate is preferably left in the oxygen atmosphere for one hour or more, and more preferably for one hour to 24 hours.

The first reflective layer and the second reflective layer may be formed by various vapor growth methods, for example, a vacuum evaporation method, a sputtering method, a plasma CVD method, an optical CVD method, an ion plating method, an electron-beam deposition method, and the like. Among these methods, a sputtering method excels in mass productivity, quality of layers, and the like.

Examples of the other steps include a step for forming a dye layer, and a step for forming a reflective layer.

(Method for Recording and Reproducing Using the Optical Recording Medium)

In the method for the recording and reproducing according to the present invention, at lease any one of recording and reproducing of signal information in the first dye layer and the second dye layer of the optical recording medium of the present invention is performed by irradiating a laser beam to the optical recording medium from the first information layer side.

Specifically, a laser beam for recording, such as, a laser diode (for example, a laser emission wavelength of 650 nm) is irradiated to the optical recording medium from the first information layer side through an objective lens, while rotating the optical recording medium at a given linear velocity or at a given constant angular velocity. By the laser beam irradiation, the first dye layer and the second dye layer absorb the laser beam to locally increase in its temperature to form a pit and then information can be recorded by changing optical properties. Reproducing of the information recorded as described above can be performed by irradiating a laser beam from the substrate side, while rotating the optical recording medium at a given linear velocity and by detecting the reflected laser beam.

(Optical Recording and Reproducing Apparatus)

According to the optical recording and reproducing apparatus, any one of recording and reproducing of information is performed in an optical recording medium by irradiating a laser beam to the recording medium from a laser beam source, and the optical recording medium is an optical recording medium according to the present invention.

The apparatus for the optical recording and reproducing is not particularly limited and may be selected in accordance with the intended use. For instance, the optical recording and reproducing apparatus comprises a laser beam source which is a light source outputting a laser beam, such as, a laser diode; a condenser lens which focuses the laser beam output from the laser beam source to a recording medium mounted on a spindle; a laser beam detector which detects part of the laser beam output from the laser beam source; and an optical element which guides the laser beam output from the laser beam source to the condenser lens and the laser beam detector, and further comprises other units as required.

In the optical recording and reproducing apparatus, the laser beam output from the laser beam source is guided to the condenser lens by the optical element, the laser beam is focused on and irradiated to the optical recording medium to perform recording and reproducing of information. At the time, the optical recording and reproducing apparatus guides part of laser beam output from the laser beam source to the laser beam detector to control the amount of light of the laser beam source based on the amount of laser beam detected by the laser beam detector.

The laser beam detector transforms the detected amount of laser beam into a voltage or a current to output it as a signal.

Examples of the other units include a controlling unit. The controlling unit is not particularly limited, provided that the movements of the individual units can be controlled, and may be selected in accordance with the intended use. Examples of the controlling unit include a device, such as, a order, a computer.

According to the present invention, it is possible to present an optical recording medium having two information layers, which enables improving wet properties of a dye for materials for reflective layers and has excellent jitter properties of cording and reproducing properties develops less errors.

Further, according to the present invention, it is also possible to present an optical recording medium which prevents deformations of the reflective layer of the second information layer and does not cause any disturbances of groove signal, and an optical recording medium in which information is reproducible using a DVD playback player can be presented.

Hereafter, the present invention will be described in detail referring to specific examples and comparative examples; however, the present invention is not limited to the disclosed examples. On the contrary, the present invention is intended to cover various modifications and equivalent arrangements included within the spirit and scope of the appended claims. For instance, in the examples and comparative examples, the recording media were evaluated on the condition of a recording and reproducing speed as fast as DVD 2.4×, but if much higher-speed designing is provided, a much higher speed of recording and reproducing is possible. The present invention can be also applied to multilevel recording.

Example 1

A substrate made from a polycarbonate resin having a diameter of 12 cm and a thickness of 0.57 mm with concaves and convexes consecutively formed thereon for a tracking guide was prepared.

First, a squarylium dye expressed by the following formula was dissolved in a tetrafluoropropanole to prepare a coating solution. The coating solution was coated on the substrate by spin-coating to form a first dye layer having a thickness of 100 nm and then the first dye layer was dried at 100° C. for 30 minutes.

<Formula of Squarylium Dye>

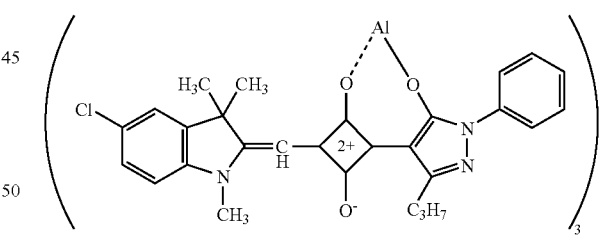

Next, a semi-translucent reflective layer made from $Ag_{98}In_2$ was formed on the first dye layer so that the semi-translucent reflective layer had a thickness of 12 nm by sputtering.

With the above noted processes, a first information layer was formed on the substrate.

Then, a cover substrate made from a polycarbonate resin having a diameter of 12 cm and a thickness of 0.6 mm was prepared.

A reflective layer made from $Ag_{98}In_2$ was formed on the cover substrate by sputtering so that the reflective layer had a thickness of 130 nm.

Next, a layer made from $Ag_{97}In_3$ was formed on the reflective layer by sputtering so that the layer had a thickness of 2 nm. Then the layer was left in an oxygen atmosphere for one hour to form an $Ag_{97}In_2O_1$ layer.

Next, a squarylium dye expressed by the following formula was dissolved in a tetrafluoropropanole to prepare a coating solution. The coating solution was coated on the oxidized layer by spin-coating to form a second dye layer having a thickness of 100 nm and then the second dye layer was dried at 100° C. for 30 minutes.

<Formula of Squarylium Dye>

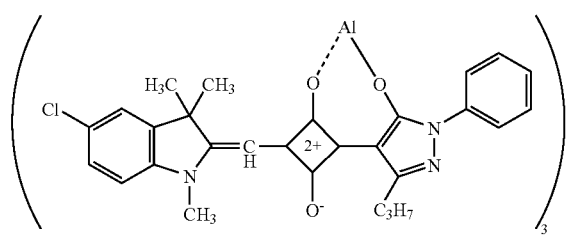

Next, a protective layer made from a mixture of ZnS and SiC was formed on the second dye layer by sputtering so that the protective layer had a thickness of 120 nm.

With the above noted processes, a second information layer was formed on the cover substrate.

The substrate with the first information layer formed thereon and the cover substrate with the second information layer formed thereon were laminated each other through an intermediate layer (SD318, manufactured by DAINIPPON INK AND CHEMICALS, INC.) so that these dye layers were disposed inside of their substrates to prepare an optical recording medium having two information layers.

It is noted that the thickness of the oxidized layer was measured using a high resolution transmission electron microscope (HRTEM).

Examples 2 Thorough 16 and Comparative Examples 1 Through to 3

Individual optical recording media for Examples 2 through 16 and Comparative Examples 1 through 3 were prepared in the same manner as Example 1 except that individual layers thereof were formed by using the materials shown in Table 1, with the respective thicknesses shown in Table 2. It should be noted that in Comparative Example 1 to 3 no oxidized layer was provided; in Examples 14 to 16 a reflectance-reduced layer made from MgF, $SiO_2$, and a fluorocarbon resin, was formed on the surface of the substrate; in Examples 4 to 16 and Comparative Example 2 a protective layer was structured into two layers; and in Examples 2 through 16 and Comparative Example 3, a heat resistant layer was formed and provided.

TABLE 1

| | Substrate | 1st dye layer | Semi-translucent reflective layer | Intermediate layer | 1st protective layer | Protective layer or 2nd protective layer | 2nd dye layer | Oxidation layer | Reflective layer | Heat resistant layer | Cover substrate |
|---|---|---|---|---|---|---|---|---|---|---|---|
| Ex. 1 | Polycarbonate | Squarylium | $Ag_{98}In_2$ | UV resin (SD318) | — | ZnS + SiC | Squarylium | $Ag_{97}In_2O_1$ | $Ag_{98}In_2$ | — | Polycarbonate |
| Ex. 2 | Polycarbonate | Squarylium | $Ag_{98}In_2$ | UV resin (SD318) | — | ZnS + SiC | Squarylium | $Ag_{97}In_2O_1$ | $Ag_{98}In_2$ | $Ta_2O_5$ | Polycarbonate |
| Ex. 3 | Polycarbonate | Squarylium | $Ag_{98}In_2$ | UV resin (SD318) | — | ZnS + SiC | Squarylium | $Ag_{97}In_2O_1$ | $Ag_{98}In_2$ | $Ti_2O_3$ | Polycarbonate |
| Ex. 4 | Polycarbonate | Squarylium | $Ag_{98}In_2$ | UV resin (SD318) | IZO | ZnS + SiC | Squarylium | $Ag_{97}In_2O_1$ | $Ag_{98}In_2$ | TiC | Polycarbonate |
| Ex. 5 | Polycarbonate | Squarylium | $Ag_{98}In_2$ | UV resin (SD318) | $SiO_2$ | ZnS + SiC | Squarylium | $Ag_{97}In_2O_1$ | $Ag_{98}In_2$ | $V_2O_3$ | Polycarbonate |
| Ex. 6 | Polycarbonate | Squarylium | $Ag_{98}In_2$ | UV resin (SD318) | ITO | ZnS + SiC | Squarylium | $Ag_{97}In_2O_1$ | $Ag_{98}In_2$ | TiN | Polycarbonate |
| Ex. 7 | Polycarbonate | Squarylium | $Ag_{98}In_2$ | UV resin (SD318) | IZO | ZnS + SiC | Squarylium | $Ag_{97}In_2O_1$ | $Ag_{98}In_2$ | $Si_3N_4$ | Polycarbonate |
| Ex. 8 | Polycarbonate | Squarylium | $Ag_{98}In_2$ | UV resin (SD318) | $Ti_2O_3$ | ZnS + SiC | Squarylium | $Ag_{97}In_2O_1$ | $Ag_{98}In_2$ | Ti | Polycarbonate |
| Ex. 9 | Polycarbonate | Squarylium | $Ag_{98}In_2$ | UV resin (SD318) | IZO | ZnS + SiC | Squarylium | $Ag_{97}In_2O_1$ | $Ag_{98}In_2$ | Ta | Polycarbonate |
| Ex. 10 | Polycarbonate | Squarylium | $Ag_{98}In_2$ | UV resin (SD318) | ITO | ZnS + SiC | Squarylium | $Ag_{97}In_2O_1$ | $Ag_{98}In_2$ | W | Polycarbonate |
| Ex. 11 | Polycarbonate | Squarylium | $Ag_{98}In_2$ | UV resin (SD318) | ZnO | ZnS + SiC | Squarylium | $Ag_{97}In_2O_1$ | $Ag_{98}In_2$ | V | Polycarbonate |
| Ex. 12 | Polycarbonate | Squarylium | $Ag_{98}In_2$ | UV resin (SD318) | ZrO | ZnS + SiC | Squarylium | $Ag_{97}In_2O_1$ | $Ag_{98}In_2$ | Mo | Polycarbonate |
| Ex. 13 | Polycarbonate | Squarylium | $Ag_{98}In_2$ | UV resin (SD318) | $Al_2O_3$ | ZnS + SiC | Squarylium | $Ag_{97}In_2O_1$ | $Ag_{98}In_2$ | Si | Polycarbonate |
| Ex. 14 | MgF + Polycarbonate | Squarylium | $Ag_{98}In_2$ | UV resin (SD318) | IZO | ZnS + SiC | Squarylium | $Ag_{97}In_2O_1$ | $Ag_{98}In_2$ | TiC | Polycarbonate |
| Ex. 15 | $SiO_2$ + Polycarbonate | Squarylium | $Ag_{98}In_2$ | UV resin (SD318) | IZO | ZnS + SiC | Squarylium | $Ag_{97}In_2O_1$ | $Ag_{98}In_2$ | TiC | Polycarbonate |
| Ex. 16 | Fluorocarbon resin + Polycarbonate | Squarylium | $Ag_{98}In_2$ | UV resin (SD318) | IZO | ZnS + SiC | Squarylium | $Ag_{97}In_2O_1$ | $Ag_{98}In_2$ | TiC | Polycarbonate |

TABLE 1-continued

| | Substrate | 1st dye layer | Semi-translucent reflective layer | Intermediate layer | 1st protective layer | Protective layer or 2nd protective layer | 2nd dye layer | Oxidation layer | Reflective layer | Heat resistant layer | Cover substrate |
|---|---|---|---|---|---|---|---|---|---|---|---|
| Compara. Ex. 1 | Poly-carbonate | Squarylium | $Ag_{98}In_2$ | UV resin (SD318) | — | $ZnS + SiO_2$ | Squarylium | — | $Ag_{98}In_2$ | — | Poly-carbonate |
| Compara. Ex. 2 | Poly-carbonate | Squarylium | $Ag_{98}In_2$ | UV resin (SD318) | IZO | $ZnS + SiO_2$ | Squarylium | — | $Ag_{98}In_2$ | — | Poly-carbonate |
| Compara. Ex. 3 | Poly-carbonate | Squarylium | $Ag_{98}In_2$ | UV resin (SD318) | — | $ZnS + SiO_2$ | Squarylium | — | $Ag_{98}In_2$ | TiC | Poly-carbonate |

ITO: $In_2O_3 + SnO$
IZO: $In_2O_3 + ZnO$

TABLE 2

| | Substrate (Thickness) | 1st dye layer (Thickness) | Semi-translucent reflective layer (Thickness) | Intermediate layer (Thickness) | 1st protective layer (Thickness) | Protective layer or 2nd protective layer (Thickness) | 2nd dye layer (Thickness) | Oxidation layer (Thickness) | Reflective layer (Thickness) | Heat resistant layer (Thickness) | Cover substrate (Thickness) |
|---|---|---|---|---|---|---|---|---|---|---|---|
| Ex. 1 | 0.57 mm | 100 nm | 12 nm | 47 μm ± 3 μm | — | 120 nm | 100 nm | 2 nm | 130 nm | — | 0.6 mm |
| Ex. 2 | 0.57 mm | 100 nm | 12 nm | 47 μm ± 3 μm | — | 130 nm | 100 nm | 1 nm | 140 nm | 10 nm | 0.6 mm |
| Ex. 3 | 0.57 mm | 100 nm | 12 nm | 47 μm ± 3 μm | — | 150 nm | 100 nm | 3 nm | 130 nm | 5 nm | 0.6 mm |
| Ex. 4 | 0.57 mm | 100 nm | 12 nm | 47 μm ± 3 μm | 60 nm | 70 nm | 100 nm | 2 nm | 140 nm | 10 nm | 0.6 mm |
| Ex. 5 | 0.57 mm | 100 nm | 12 nm | 47 μm ± 3 μm | 60 nm | 80 nm | 100 nm | 2 nm | 150 nm | 5 nm | 0.6 mm |
| Ex. 6 | 0.57 mm | 100 nm | 12 nm | 47 μm ± 3 μm | 60 nm | 70 nm | 100 nm | 2 nm | 160 nm | 5 nm | 0.6 mm |
| Ex. 7 | 0.57 mm | 100 nm | 12 nm | 47 μm ± 3 μm | 60 nm | 80 nm | 100 nm | 2 nm | 160 nm | 5 nm | 0.6 mm |
| Ex. 8 | 0.57 mm | 100 nm | 12 nm | 47 μm ± 3 μm | 60 nm | 70 nm | 100 nm | 2 nm | 160 nm | 5 nm | 0.6 mm |
| Ex. 9 | 0.57 mm | 100 nm | 12 nm | 47 μm ± 3 μm | 60 nm | 60 nm | 100 nm | 2 nm | 160 nm | 5 nm | 0.6 mm |
| Ex. 10 | 0.57 mm | 100 nm | 12 nm | 47 μm ± 3 μm | 60 nm | 70 nm | 100 nm | 2 nm | 160 nm | 5 nm | 0.6 mm |
| Ex. 11 | 0.57 mm | 100 nm | 12 nm | 47 μm ± 3 μm | 60 nm | 80 nm | 100 nm | 2 nm | 160 nm | 5 nm | 0.6 mm |
| Ex. 12 | 0.57 mm | 100 nm | 12 nm | 47 μm ± 3 μm | 60 nm | 70 nm | 100 nm | 2 nm | 160 nm | 5 nm | 0.6 mm |
| Ex. 13 | 0.57 mm | 100 nm | 12 nm | 47 μm ± 3 μm | 60 nm | 80 nm | 100 nm | 2 nm | 160 nm | 5 nm | 0.6 mm |
| Ex. 14 | MgF(120 nm) 0.57 mm | 100 nm | 12 nm | 47 μm ± 3 μm | 60 nm | 70 nm | 100 nm | 2 nm | 160 nm | 5 nm | 0.6 mm |
| Ex. 15 | $SiO_2$(106 nm) 0.57 mm | 100 nm | 12 nm | 47 μm ± 3 μm | 60 nm | 70 nm | 100 nm | 2 nm | 160 nm | 5 nm | 0.6 mm |
| Ex. 16 | Fluorocarbon resin (120 nm) 0.57 mm | 100 nm | 12 nm | 47 μm ± 3 μm | 60 nm | 70 nm | 100 nm | 2 nm | 160 nm | 5 nm | 0.6 mm |
| Compara. Ex. 1 | 0.57 mm | 100 nm | 12 nm | 47 μm ± 3 μm | — | 120 nm | 100 nm | — | 110 nm | — | 0.6 mm |
| Compara. Ex. 2 | 0.57 mm | 100 nm | 12 nm | 47 μm ± 3 μm | 60 nm | 70 nm | 100 nm | — | 120 nm | — | 0.6 mm |
| Compara. Ex. 3 | 0.57 mm | 100 nm | 12 nm | 47 μm ± 3 μm | — | 130 nm | 100 nm | — | 120 nm | 5 nm | 0.6 mm |

The optical recording media in the Examples and Comparative Examples were evaluated using an apparatus for evaluations of properties (DDU-1000, manufactured by Pulstec Industrial Co., Ltd.). With respect to the conditions for recording and reproducing, the following conditions were used:

Recording linear velocity: DVD 2.4×(2.4×3.4 m/sec.)
Reproducing power: 0.7 mW
Bottom power: 0.7 mW
Recording strategy: Multi-pulse [Leading edge: 0.4 T, Multi-pulse 0.2 T (n-2)]

Tables 3 to 5 show the evaluation results. It is noted that Table 3 shows the evaluation results of the fist information layer, and Tables 4 and 5 show the evaluation results of the second information layer.

TABLE 3

First Information Layer

| Example | Recording Sensitivity (mW) | Jitter value (%) | Reflectance (%) | DPD signal |
|---|---|---|---|---|
| Ex. 1 | 16 | 6.8 | 16.1 | 0.62 |
| Ex. 2 | 17 | 7.1 | 16.5 | 0.65 |
| Ex. 3 | 16 | 6.9 | 15.5 | 0.60 |
| Ex. 4 | 17 | 7.3 | 17.3 | 0.55 |
| Ex. 5 | 16 | 7.2 | 15.0 | 0.58 |
| Ex. 6 | 16 | 7.2 | 15.5 | 0.65 |
| Ex. 7 | 16 | 7.2 | 15.7 | 0.55 |
| Ex. 8 | 16 | 7.2 | 16.0 | 0.58 |
| Ex. 9 | 16 | 7.2 | 16.3 | 0.55 |
| Ex. 10 | 16 | 7.2 | 16.5 | 0.60 |
| Ex. 11 | 16 | 7.2 | 17.0 | 0.60 |
| Ex. 12 | 16 | 7.2 | 15.8 | 0.62 |
| Ex. 13 | 16 | 7.2 | 15.8 | 0.62 |
| Ex. 14 | 16 | 7.2 | 18.1 | 0.68 |
| Ex. 15 | 16 | 7.2 | 18.2 | 0.67 |

TABLE 3-continued

First Information Layer

| Example | Recording Sensitivity (mW) | Jitter value (%) | Reflectance (%) | DPD signal |
|---|---|---|---|---|
| Ex. 16 | 16 | 7.2 | 18.3 | 0.65 |
| Compara. Ex. 1 | 17 | 7.2 | 14.0 | 0.55 |
| Compara. Ex. 2 | 18 | 7.2 | 15.3 | 0.57 |
| Compara. Ex. 3 | 18 | 7.2 | 12.0 | 0.57 |

TABLE 4

Second Information Layer

| Example | Recording Sensitivity (mW) | Jitter value (%) | Reflectance (%) | DPD signal |
|---|---|---|---|---|
| Ex. 1 | 18 | 6.8 | 16.7 | 0.62 |
| Ex. 2 | 19 | 7.1 | 17.2 | 0.65 |
| Ex. 3 | 18 | 6.9 | 15.5 | 0.60 |
| Ex. 4 | 19 | 7.3 | 16.0 | 0.55 |
| Ex. 5 | 20 | 7.2 | 17.2 | 0.58 |
| Ex. 6 | 20 | 7.2 | 16.0 | 0.65 |
| Ex. 7 | 20 | 7.2 | 16.6 | 0.55 |
| Ex. 8 | 20 | 7.2 | 16.2 | 0.58 |
| Ex. 9 | 20 | 7.2 | 16.0 | 0.55 |
| Ex. 10 | 20 | 7.2 | 15.8 | 0.60 |
| Ex. 11 | 20 | 7.2 | 15.5 | 0.60 |
| Ex. 12 | 20 | 7.2 | 16.4 | 0.62 |
| Ex. 13 | 20 | 7.2 | 16.4 | 0.65 |
| Ex. 14 | 20 | 7.2 | 18.1 | 0.68 |
| Ex. 15 | 20 | 7.2 | 18.0 | 0.69 |
| Ex. 16 | 20 | 7.2 | 18.3 | 0.68 |
| Compara. Ex. 1 | 19 | 16.3 | 14.0 | 0.55 |
| Compara. Ex. 2 | 19 | 12.3 | 15.3 | 0.53 |
| Compara. Ex. 3 | 19 | 13.3 | 13.0 | 0.57 |

TABLE 5

Second Information Layer

| Example | Recording Sensitivity (mW) | C/N (dB) |
|---|---|---|
| Ex. 1 | 18 | 6.8 |
| Ex. 2 | 19 | 7.1 |
| Ex. 3 | 18 | 6.9 |
| Ex. 4 | 19 | 7.3 |
| Ex. 5 | 20 | 7.2 |
| Ex. 6 | 20 | 7.2 |
| Ex. 7 | 20 | 7.2 |
| Ex. 8 | 20 | 7.2 |
| Ex. 9 | 20 | 7.2 |
| Ex. 10 | 20 | 7.2 |
| Ex. 11 | 20 | 7.2 |
| Ex. 12 | 20 | 7.2 |
| Ex. 13 | 20 | 7.2 |
| Ex. 14 | 20 | 7.2 |
| Ex. 15 | 20 | 7.2 |
| Ex. 16 | 20 | 7.2 |
| Compara. Ex. 1 | 19 | 43 |
| Compara. Ex. 2 | 19 | 27 |
| Compara. Ex. 3 | 19 | 21 |

Results of Tables 3 to 5 indicate that any of the optical recording media of Examples 1 through 16 respectively showed an excellent jitter properties and showed a reflectance of 15% or more. In addition, they individually showed an excellent DPD signal of 0.5 or more and were reproducible using a DVD player.

On the contrary, the optical recording media of Comparative Examples 1 to 3 in which no oxidized layer was formed, showed a reflectance less than 15%, except Comparative Example 2, and all of them showed a jitter value in the second information layer inferior to those of Examples 1 through 16 and showed a very poor CN value because deformations of these reflective layers were large. Particularly in Comparative Example 3, a record mark was derailed from its track at a high power (22 mW).

What is claimed is:

1. An optical recording medium comprising:
   a substrate;
   a first information layer and a second information layer disposed on the substrate; and
   an intermediate layer disposed between the first information layer and the second information layer,
   wherein the first information layer and the second information layer are irradiated with a laser beam from the first information layer side to perform any one of recording and reproducing respectively in the first information layer and the second information layer, and
   wherein the second information layer comprises a protective layer, a second dye layer which comprises an organic dye, an oxidized layer, a reflective layer, and a heat resistant layer in this order from the laser beam irradiation side, and the oxidized layer comprises an oxide which is a material constituting the reflective layer, and
   wherein the heat resistant layer comprises one material selected from W, Mo, Ti, V, an oxide thereof, a carbide thereof, and a nitride thereof.

2. The optical recording medium according to claim 1, further comprising:
   a reflectance-reduced layer disposed on the surface of the substrate on the laser beam irradiation side.

* * * * *